United States Patent
Habbley et al.

(10) Patent No.: US 8,278,867 B2
(45) Date of Patent: Oct. 2, 2012

(54) CIRCUIT AND METHOD FOR APPLYING A THREE PHASE POWER SOURCE TO A THREE PHASE LOAD

(75) Inventors: Dale Lee Habbley, Woodstock, IL (US); Paul Mitkusevitch, Machesney Park, IL (US); Benjamin Samuels, Jr., Elgin, IL (US); Julian Opificius, Elk River, MN (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 13/040,152

(22) Filed: Mar. 3, 2011

(65) Prior Publication Data

US 2012/0223748 A1  Sep. 6, 2012

(51) Int. Cl.
H02P 6/00 (2006.01)

(52) U.S. Cl. .................................. 318/727; 318/400.35

(58) Field of Classification Search ................... 318/813, 318/400.35, 727, 812
See application file for complete search history.

(56) References Cited

U.S. PATENT DOCUMENTS

| | | | |
|---|---|---|---|
| 4,245,184 A | 1/1981 | Billings et al. | |
| 4,356,525 A * | 10/1982 | Kornrumpf et al. | 361/4 |
| 4,399,395 A * | 8/1983 | Espelage | 318/803 |
| 4,528,494 A | 7/1985 | Bloomer | |
| 4,567,425 A | 1/1986 | Bloomer | |
| 4,596,121 A * | 6/1986 | Ogata | 62/133 |
| 4,680,490 A | 7/1987 | Baker et al. | |
| 4,900,900 A * | 2/1990 | Shirae et al. | 219/501 |
| 5,293,308 A * | 3/1994 | Boys et al. | 363/37 |
| 6,274,851 B1 * | 8/2001 | Mulcahy et al. | 219/501 |

* cited by examiner

*Primary Examiner* — Rina Duda
(74) *Attorney, Agent, or Firm* — McGarry Bair PC

(57) ABSTRACT

A circuit and method of applying a three phase power source to a load such that each phase is applied to the load in a manner, such as a predetermined sequence, so as to reduce the electromagnetic interference (EMI) and heat generated in the switching devices during the application and removal of each phase to the load.

19 Claims, 4 Drawing Sheets

CIRCUIT AND METHOD FOR APPLYING A THREE PHASE POWER SOURCE TO A THREE PHASE LOAD

BACKGROUND OF THE INVENTION

Three phase electric power is a common method of transmitting electric energy. Typically, the three phases of the electric power source vary sinusoidally, have the same average voltage and frequency, and exhibit a fixed 120° ($2\pi/3$ radians) phase relationship with respect to each other. When applied to substantially resistive loads such as heaters, the phase currents exhibit minimal phase lead or lag with respect to applied voltage, realizing a power factor of 0.95 or greater. The peak voltage, peak current, and the voltage and current zero crossings for each of the phases therefore occur at equidistant, detectable intervals.

Generally, three phase power is applied to a three phase load in a manner where all of the phases are applied to the load at the same time via a switching method. As a result of this, during a switching event where all three phases are applied simultaneously to the load, at least one of the phases generates a rapid increase in current limited only by the inductance of the load circuit and electromagnetic interference (EMI) can be generated. Due to the non-linearity of the switching circuits, this EMI may be spread over a wide spectral range and may have strong energy components at higher order harmonics. Such EMI may interfere with other electronic systems, such as radio communications systems. Additionally, the switching event can generate heat in the switching circuits as the constituent switching devices switch between off and on states, especially if the switching occurs at a point in time when a particular phase of the power source will drive or is driving a high current. This loss can become particularly significant in burst mode or other applications in which power is applied and removed rapidly and continuously, such as in high precision temperature control systems.

BRIEF DESCRIPTION OF THE INVENTION

One embodiment of a method of applying a three phase power source to a three phase load includes the following steps: receiving a first sense signal corresponding to a first phase of the power source, a second sense signal corresponding to a second phase of the power source, and a third sense signal corresponding to a third phase of the power source; detecting a mutual crossing of the first and second sense signals and determining if a command signal is activated and if the mutual crossing is detected and the command signal is activated then activating a first synchronization signal corresponding to the first phase of the power source and activating a second synchronization signal corresponding to the second phase of the power source; determining if the first and second synchronization signals are activated and if the first and second synchronization signals are activated, then applying the first and the second phases of the power source to the first and second phases of the load, respectively; detecting a zero crossing of the third sense signal and if the zero crossing is detected and if the first and second synchronization signals are activated, then activating a third synchronization signal corresponding to the third phase of the power source; determining if the third synchronization signal is activated and if the third synchronization signal is activated, then applying the third phase of the power source to the third phase of the load; and returning to the first step if the first, second, and third synchronization signals are not activated.

DETAILED DESCRIPTION

This disclosure relates to applying a three phase power source to a three phase resistive referenced or floating load in a manner that reduces electromagnetic interferences (EMI) and thermal dissipation in the switching devices as the load is applied. In particular, the three phases of the power source are not applied concurrently, but instead are applied in a sequence such that the instantaneous change of current flow in the load upon the application of each of the phases can be minimized, thereby also minimizing EMI and thermal dissipation in the switching circuits responsible for applying power to the load.

Figure 1:
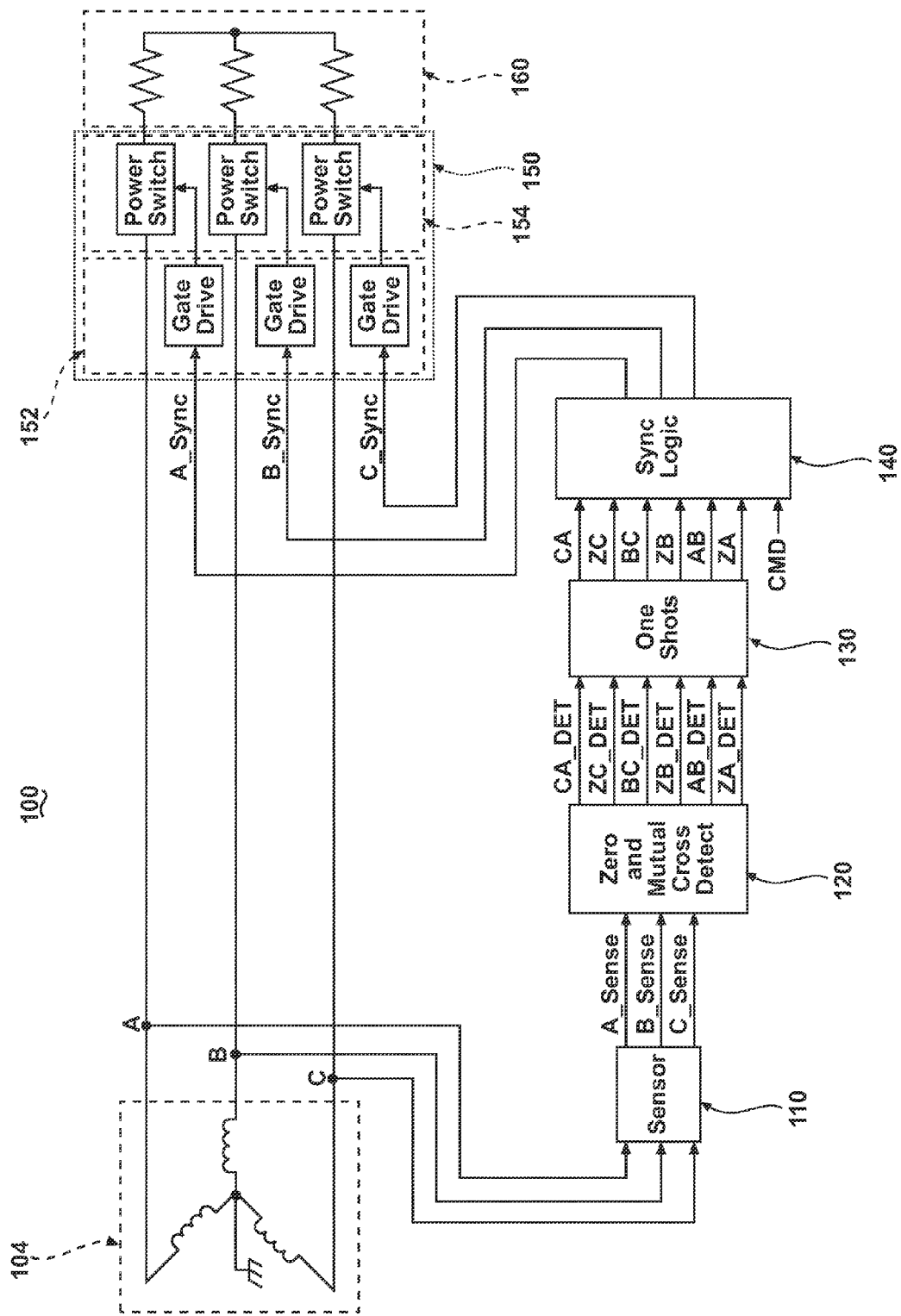
FIG. 1 is a block diagram of a circuit for applying a three phase power source to a floating resistive load according to one embodiment of the present invention.

Referring now to FIG. 1, a circuit 100 for applying three power phases A, B, and C, representing first, second, and third phases, respectively, of a three phase power supply 104 to a load 160 is disclosed. The three phases A, B, and C are supplied to a sensor 110. The sensor 110 can comprise a step down transformer to reduce the voltage of the three phases A, B, and C. The sensor 110 can also generate a sense signal A_SENSE, B_SENSE, and C_SENSE indicative of the stepped down voltage corresponding to each of the three phases A, B, and C, respectively.

The three sense signals A_SENSE, B_SENSE, and C_SENSE are then input into a zero and mutual cross detect circuit 120 comprising a comparator circuit corresponding to each permutation of A_SENSE, B_SENSE, C_SENSE, and a ground signal. The output of the zero and mutual cross detect circuit 120 includes six detection signals CA_DET, ZC_DET, BC_DET, ZB_DET, AB_DET, ZA_DET indicative of the comparison of each permutation of A_SENSE, B_SENSE, C_SENSE, and the ground signal by a zero and mutual cross detect module. CA_DET corresponds to the output of a comparison of A_SENSE and C_SENSE; ZC_DET corresponds to the output of a comparison of the ground and C_SENSE; BC_DET corresponds to the output of a comparison of B_SENSE and C_SENSE; ZB_DET corresponds to the output of a comparison of the ground and B_SENSE; AB_DET corresponds to the output of a comparison of A_SENSE and B_SENSE; and ZA_DET corresponds to the output of a comparison of the ground and A_SENSE.

The detection signals CA_DET, ZC_DET, BC_DET, ZB_DET, AB_DET, ZA_DET are then input to a one shot circuit 130 that generates a pulse signal CA, ZC, BC, ZB, AB, and ZA corresponding to each of the detection signals CA_DET, ZC_DET, BC_DET, ZB_DET, AB_DET, ZA_DET, respectively. The pulse signals CA, ZC, BC, ZB, AB, and ZA are generally set low except at the points in time when a mutual crossing or a zero crossing of one of the sense signals A_SENSE, B_SENSE, and C_SENSE is detected, at which point a pulse is generated on the pulse signals CA, ZC, BC, ZB, AB, and ZA by one shot circuit 130. In other words, pulse signals CA, ZC, BC, ZB, AB, and ZA will be pulse trains with pulses when A_SENSE crosses C_SENSE, C_SENSE crosses ground, B_SENSE crosses C_SENSE, B_SENSE crosses ground, A_SENSE crosses B_SENSE, and A_SENSE crosses ground, respectively.

Figure 3:
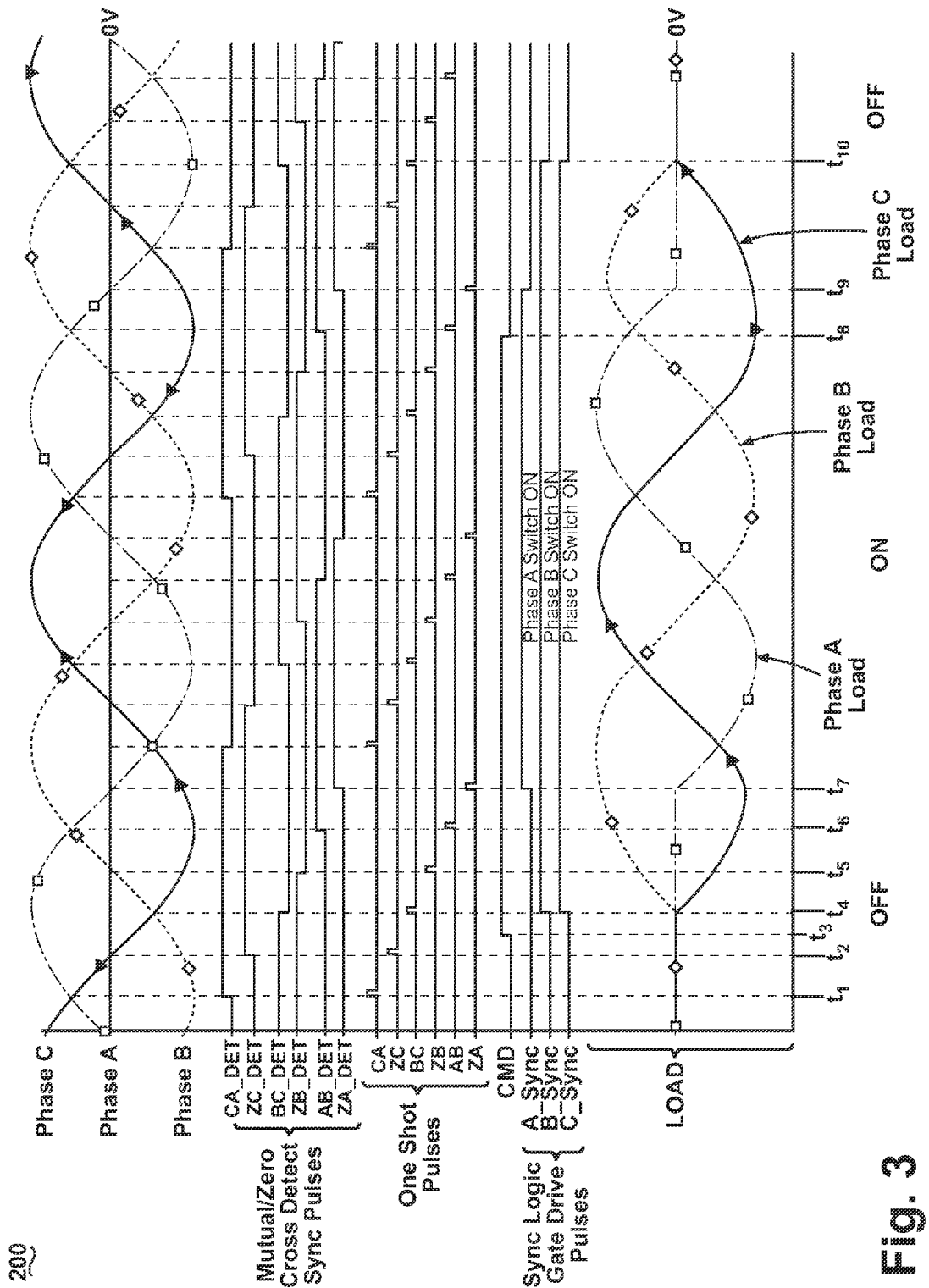
FIG. 3 is a signal diagram depicting the signals associated with a method of applying the three phase power source to a floating resistive load using the circuit depicted in FIG. 1.

Looking also at FIG. 3, the pulse signals CA, ZC, BC, ZB, AB, and ZA, are regularly input to a synchronization logic 140 when the power phases are active and sensed. When the power is to be applied to the load, a command signal CMD is input to the synchronization logic 140, at which time the synchronization logic 140 generates three synchronization signals A_SYNC, B_SYNC, and C_SYNC based on the inputs CA, ZC, BC, ZB, AB, ZA, and CMD. As an example, the CMD signal can be a user input signal indicative of the user's desire to turn on the load device. The synchronization logic 140 activates two of the three synchronization signals A_SYNC, B_SYNC, and C_SYNC, when the CMD signal is activated and a pulse is detected based on one of the mutual crossing pulse signals CA, BC, and AB after the activation of the CMD signal. If the CMD signal is not activated, then none of the synchronization signals A_SYNC, B_SYNC, and C_SYNC are toggled from a deactivated state to an activated state. If, however, the CMD signal is activated and a first pulse is detected on one of the mutual phase crossing pulse signals CA, BC, and AB, then the corresponding two synchronization signals (two of A_SYNC, B_SYNC, and C_SYNC) are activated. For example, if the first pulse is detected on the BC signal after the CMD signal is activated, then B_SYNC and C_SYNC are activated. Once two of the synchronization signals (two of A_SYNC, B_SYNC, and C_SYNC) are activated, the synchronization logic 140 monitors for the zero crossing pulse signals ZC, ZB, and ZA phase corresponding to the non-activated synchronization signal. When the zero crossing pulse signal corresponding to the non-activated synchronization signal is detected, then the remaining non-activated synchronization signal is activated. Continuing with our example, after B_SYNC and C_SYNC are activated, the synchronization logic 140 monitors for signal ZA and once a pulse is detected on signal ZA, A_SYNC is activated, thereby applying full three phase power to the load.

In addition to sequentially activating the synchronization signals A_SYNC, B_SYNC, and C_SYNC from a deactivated state when the CMD signal is activated, the synchronization logic 140 can also sequentially deactivate the synchronization signals A_SYNC, B_SYNC, and C_SYNC from an activated state upon the deactivation of the CMD signal. If the CMD signal is not deactivated from an activated state, then none of the synchronization signals A_SYNC, B_SYNC, and C_SYNC are toggled from an activated state to a deactivated state. If, however, the CMD signal is deactivated from an activated state, then the synchronization logic 140 monitors for the next zero crossing signals ZC, ZB, and ZA and when the a first pulse is detected on one of the zero crossing signals ZC, ZB, and ZA, the corresponding synchronization signal A_SYNC, B_SYNC, and C_SYNC is deactivated. For example, if the first pulse is detected on the ZC signal after the CMD signal is deactivated, then C_SYNC is deactivated. Once one of the synchronization signals (one of A_SYNC, B_SYNC, and C_SYNC) is deactivated, the synchronization logic 140 monitors for the next mutual crossing pulse signal CA, BC, and AB corresponding to the two remaining activated synchronization signals (two of A_SYNC, B_SYNC, and C_SYNC). When a pulse is detected on the monitored mutual pulse signal (one of CA, BC, and AB), the corresponding two synchronization signals (two of A_SYNC, B_SYNC, and C_SYNC) are deactivated. Continuing with our example, once C-SYNC is deactivated, the synchronization logic 140 monitors for signal AB and once a pulse is detected on signal AB, both A_SYNC and B_SYNC are deactivated. The circuit topology of the synchronization logic 140 is discussed in greater detail in conjunction with FIG. 2.

The synchronization signals A_SYNC, B_SYNC, and C_SYNC along with the phases of the power source A, B, and C are input to a drive switch 150. The drive switch can comprise a gate drive 152 and a power switch 154 corresponding to each phase of the load 160. The drive switch 150 monitors A_SYNC, B_SYNC, and C_SYNC and applies each of the phases A, B, and C to the load 160 only as the corresponding synchronization signals A_SYNC, B_SYNC, and C_SYNC are activated. When the synchronization signals A_SYNC, B_SYNC, and C_SYNC are not activated, the drive switch 150 does not apply the corresponding phases A, B, and C to the load 160. When the synchronization signals A_SYNC, B_SYNC, and C_SYNC are deactivated, the drive switch 150 removes the phases A, B, and C from the load 160 as the corresponding synchronization signals A_SYNC, B_SYNC, and C_SYNC are deactivated.

Each of the constituent blocks 110, 120, 130, 140, and 150 in FIG. 1 are discussed here. In addition to comprising a step down transformer and an ammeter, the sensor 110 may comprise any variety of passive or active circuit elements, including, for example, resistors, capacitors, inductors, diodes, and transistors. As one alternative the sensor 110 may comprise a low pass filter to filter out high frequency noise in the circuit. As another alternative, the sensor 110 may comprise a band pass filter for filtering out both high frequency and low frequency noise. Although in this embodiment, the sensor 110 detects the voltage of the three phases A, B, and C using a step down transformer, the sensor 110 can alternatively detect a current of the three phases to achieve the same result.

The zero and mutual cross detect circuit 120 can comprise comparators to generate each of the output detection signals CA_DET, ZC_DET, BC_DET, ZB_DET, AB_DET, ZA_DET. The comparators may be any known type of comparator, including but not limited to a null detector. A null detector can output a positive or negative voltage based upon its inputs, which in this case is two of A_SENSE, B_SENSE, C_SENSE, and ground. The null detector may be implemented using a voltage comparator as is known in the art. As an alternate to a null detector, other types of comparators, such as a zero-crossing detector, operational amplifier or a dynamic latched comparator may be used.

The one shot circuit 130 can comprise two circuits that are also known as monostable multivibrator circuits, for generating each of the pulse signals CA, ZC, BC, ZB, AB, and ZA from the outputs of the zero and mutual cross detect circuit 120 detection signals CA_DET, ZC_DET, BC_DET, ZB_DET, AB_DET, ZA_DET. The operation of acceptable one shot circuits are well known in the industry. When the detection signals CA_DET, ZC_DET, BC_DET, ZB_DET, AB_DET, ZA_DET transition from either a positive voltage to a negative voltage or a negative voltage to a positive voltage in the zero and mutual cross detect circuit 120, the one shot circuits detect the transition and cause the output to become enabled, thereby creating a short pulse during the detected transition.

The drive switch 150 can comprise an isolated gate drive and a power switch. The power switch can further comprise either power metal-oxide-semiconductor field effect transistors (MOSFETs) or insulated gate bipolar transistors (IGBT)

to switch the individual phases A, B, and C to the load. The Signals A_SYNC, B_SYNC, and C_SYNC serve as control signals for the switching of the phases A, B, and C of the power source 104.

The power source 104 applied to the circuit 100 can be in a "Y" (or star) configuration. The power source 104 can supply three sinusoidal waveforms or phases A, B, and C with any amplitude of voltage and current and with any frequency where the three phases have a phase separation of approximately 120° ($2\pi/3$ radians). A non-limiting example of the power supply 104 is a three phase 120 Volt root mean squared (Vrms) with an oscillation frequency of 400 Hz. The load 160 can be in a "Y" (star) or a delta configuration.

The circuit 100 with each of its constituent circuits 110, 120, 130, 140, and 150 may be implemented with any appropriate partitioning. For example, each of the circuits may be discrete integrated circuits (ICs). Alternatively, the circuit 100 can be implemented as two analog and one digital partition with the first analog partition comprising circuits 110, 120, and 130, the second analog partition comprising circuit 150, and the digital partition comprising circuit 140. As a further alternative, all of the circuits 110, 120, 130, 140, and 150 can be implemented in one mixed signal IC. As yet a further alternative the synchronization logic 140 can be implemented as a field programmable gate array (FPGA) or an application specific integrated circuit (ASIC). Any known process technology can be used to fabricate the individual or integrated circuits 110, 120, 130, 140, and 150 including, but not limited to, complementary metal-oxide-semiconductor (CMOS), bipolar junction transistor and CMOS (BiCMOS), transistor-transistor logic (TTL), CMOS silicon on insulator (SOI), heterojunction bipolar transistors (HBTs), pseudomorphic high electron mobility transistors (pHEMTs), and combinations thereof.

Figure 2:
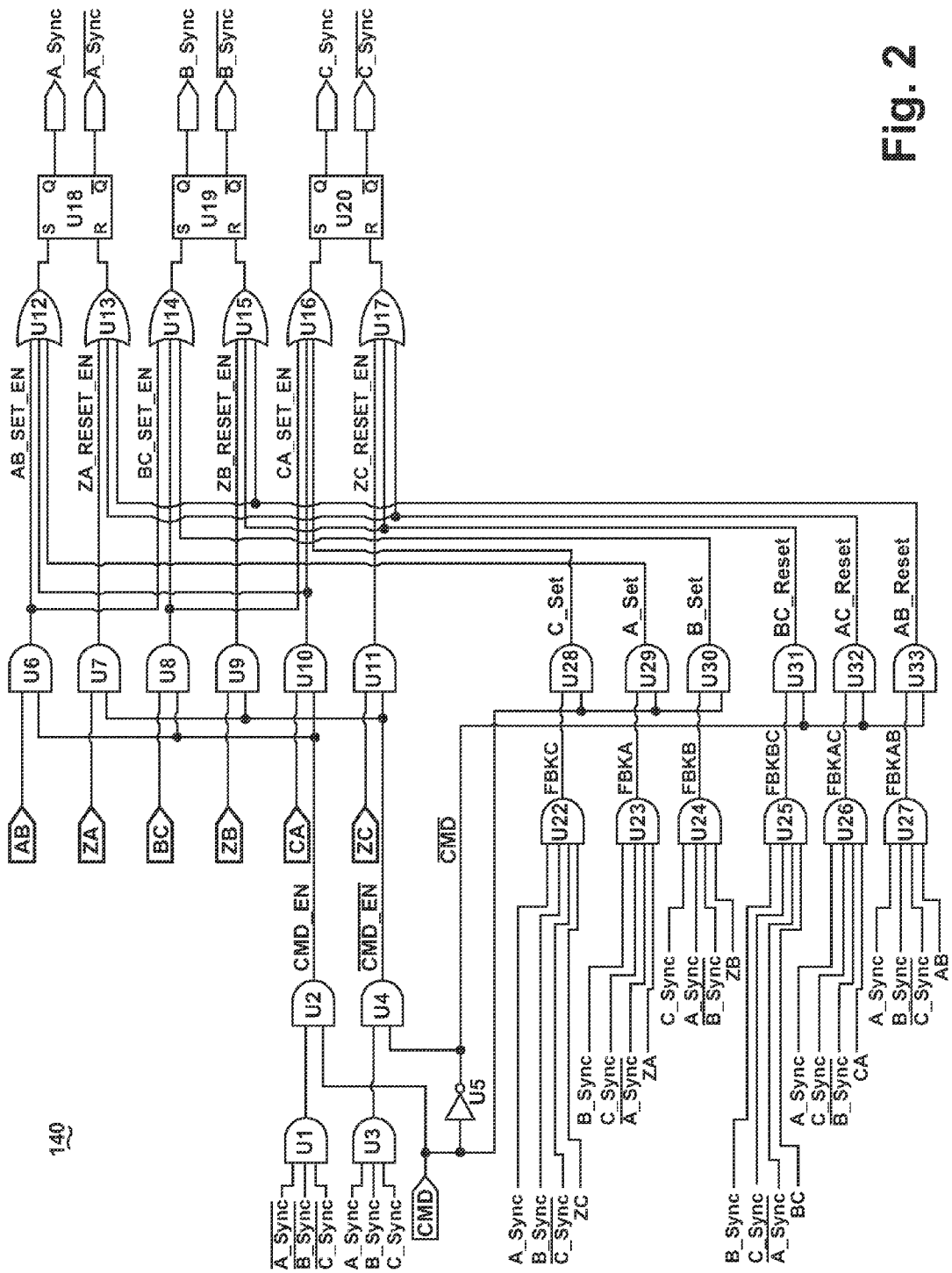
FIG. 2 is a circuit diagram of a synchronization logic circuit incorporated in the circuit for applying the three phase power source to a load of FIG. 1.

Referring now to FIG. 2, a digital circuit implementation of the synchronization circuit 140 is disclosed. The circuit 140 comprises two input AND gates U2, U4, U6, U7, U8, U9, U10, U11, U28, U29, U30, U31, U32, U33, three input AND gates U1, U3, four input AND gates U22, U23, U24, U25, U26, U27, an inverter U5, three input OR gates U12, U13, U14, U15, U16, U17, and S/R latches U18, U19, U20. The fabrication of each of the gates, latches and buffers in this circuit can use any known process technology including, but not limited to, CMOS. The six pulse signals AB, ZA, BC, ZB, CA, and ZC are input to two input AND gates U6, U7, U8, U9, U10, and U11, as well as four input AND gates U22, U23, U24, U25, U26, and U27. The CMD input is provided to inverter U5, as well as two input AND gates U2, U28, U29, and U30. The inputs AB, ZA, BC, ZB, CA, ZC, and CMD generate intermediary signals within the circuit and ultimately generate the synchronization signals A_SYNC, B_SYNC, and C_SYNC at the output of the S/R latches U18, U19, and U20. Each of the synchronization signals A_SYNC, B_SYNC, and C_SYNC are latched into their last states by the S/R latches U18, U19, and U20 until there is a change in the inputs AB, ZA, BC, ZB, CA, ZC, and CMD to prompt a change in the synchronization signals A_SYNC, B_SYNC, and C_SYNC. It should also be noted that the synchronization signals A_SYNC, B_SYNC, and C_SYNC or the inverse state of the synchronization signals $\overline{\text{A\_SYNC}}$, $\overline{\text{B\_SYNC}}$, $\overline{\text{C\_SYNC}}$ are fed back to the inputs of at least three input AND gates U1 and U3 and four input AND gates U22, U23, U24, U25, U26, and U27. FIG. 2 shows only one possible circuit implementation of the synchronization logic 140. It is appreciated that the synchronization logic 140 can be implemented in variations of the circuit implementation shown here, including all Boolean equivalents of the circuit 140.

The method of operation of the circuit for applying three phases A, B, and C of a power source 104 to a load 100 is discussed in greater detail by way of an example in FIG. 3. The plot 200 shows the three phases A, B, and C, along with the mutual and zero cross pulse signals CA_DET, ZC_DET, BC_DET, ZB_DET, AB_DET, and ZA_DET, the one shot pulses CA, ZC, BC, ZB, AB, and ZA, the command signal CMD, synchronization signals A_SYNC, B_SYNC, and C_SYNC, and the current and or voltage applied to the load, A Load, B Load, and C Load, corresponding to the first, second, and third phase inputs of the load 160, respectively. The operation of zero and mutual crossing detect circuit 120 and the one shot circuit 130 can be understood by observing the one shot pulses CA, ZC, BC, ZB, AB, and ZA as the current and voltage of the source power phases A, B, and C vary with time. When C crosses A at time t1, a pulse is generated on signal CA. At time t2, C crosses zero and therefore a pulse is generated on signal ZC. Similarly, at time t4, B and C cross with a resulting pulse on BC and at time t5, B crosses zero with a resulting pulse on ZB.

At t3, the command signal CMD is activated by rising from a logic 0 to a logic 1 level, or in other words from a low to a high level. Although in this example, activated signals are designated as a binary logical level 1, an activated signal can alternatively be represented as a binary logical level 0 without detracting from the concept. Prior to command signal CMD being activated at time t3, none of the phases of the power source A, B, and C are applied to the load 160. When CMD is activated at time t3, the synchronization signal logic block 140 looks for the first pulse on one of the mutual phase crossing pulse signals CA, BC, and AB. At t4, the first pulse is detected after CMD is activated on mutual phase crossing pulse signal BC. At this point, since CMD is activated, the two synchronization signals B_SYNC and C_SYNC corresponding to mutual phase crossing pulse signal BC are activated by the synchronization signal logic 140. Upon activation of B_SYNC and C_SYNC at time t4, the drive switch 150 applies the corresponding phases of the power source B and C to the load 160 as B Load and C Load. Additionally, when the B_SYNC and C_SYNC are activated, the synchronization logic 140 looks for the first zero crossing of the phase A which is the phase not corresponding to the activated synchronization signals B_SYNC and C_SYNC. Any pulses on the signals CA, BC, ZB, AB, ZC not on ZA are not acted upon. For example, at times t5 and t6 where pulses are observed on pulse signals ZB and AB, there are no changes to the synchronization signals A_SYNC, B_SYNC, and C_SYNC by the synchronization logic 140. At time t7, a pulse is detected on pulse signal ZA at which point CMD is still activated and therefore the synchronization signal logic 140 activates synchronization signal A_SYNC. Upon activation of A_SYNC at time t7, the drive switch 150 applies the corresponding phase of the power source A to the load 160 as A Load.

From the foregoing discussion it can be seen that all of the three phases of the power source A, B, and C are not applied to the load 160 concurrently. In the scenario described above, two of the phases, in this case B and C, were applied to the load at a time when the L-N voltages of those phases were equal, and the resulting instantaneous current was zero. Consequently, the resulting EMI and thermal output from switching was negligible. After phases B and C were applied to the load 160, the third phase, phase A, was applied to the load 160 at a later time, when the L-N voltages of phases B and C were equal and opposite and the midpoint voltage was close to zero. Again, the instantaneous current rise in phase A is substantially zero, resulting in minimized EMI and heat generation during the switching event. In other words, the change in current with time (di/dt) is low at the selected switching times, t4 and t7, and therefore advantageous from an EMI and thermal standpoint. For purposes of this description, the proceeding method of applying the phases of the power source to the load 160 is referred to as opportunistic sequencing.

Still referring to FIG. 3, the method of removing the three phases of the power supply A, B, and C from the load 160 is now discussed. Between the time when all of the phases of the power supply A, B, and C have been applied to the load at t7 until when the command signal is deactivated at time t8, the phases of the power supply A, B, and C continue to be supplied to the load 160. However, when CMD is deactivated at time t8, the synchronization signal logic 140 looks for the first pulse on one of the zero crossing pulse signals ZA, ZB, and ZC. The first pulse on one of the zero crossing pulse signals ZA, ZB, and ZC after deactivating CMD is observed on ZA at time t9. Upon detecting the pulse at t9, the synchronization signal logic 140 deactivates A_SYNC. Upon deactivation of A_SYNC at time t9, the drive switch 150 removes the corresponding phase of the power source A from the load 160 with A Load reduced to zero. Additionally, when A_SYNC is deactivated, the synchronization logic 140 looks for the first mutual crossing of the phase B and C which are the phases not corresponding to the deactivated synchronization signal A_SYNC. Any pulses on pulse signals CA, ZC, ZB, AB, ZA not on BC are not acted upon. At time t10, a pulse is detected on pulse signal BC at which point CMD is still deactivated and therefore the synchronization signal logic 140 deactivates synchronization signals B_SYNC and C_SYNC. Upon deactivation of B_SYNC and C_SYNC at time t10, the drive switch 150 removes the corresponding phases of the power source B and C from the load 160 as B Load and C Load drop to a level of zero.

All of the phases of the power supply A, B, and C are not removed from the load concurrently. Instead, the phases A, B, and C are removed in an opportunistically determined sequence to minimize switching EMI and heat generation from the drive switch 150.

Figure 4:
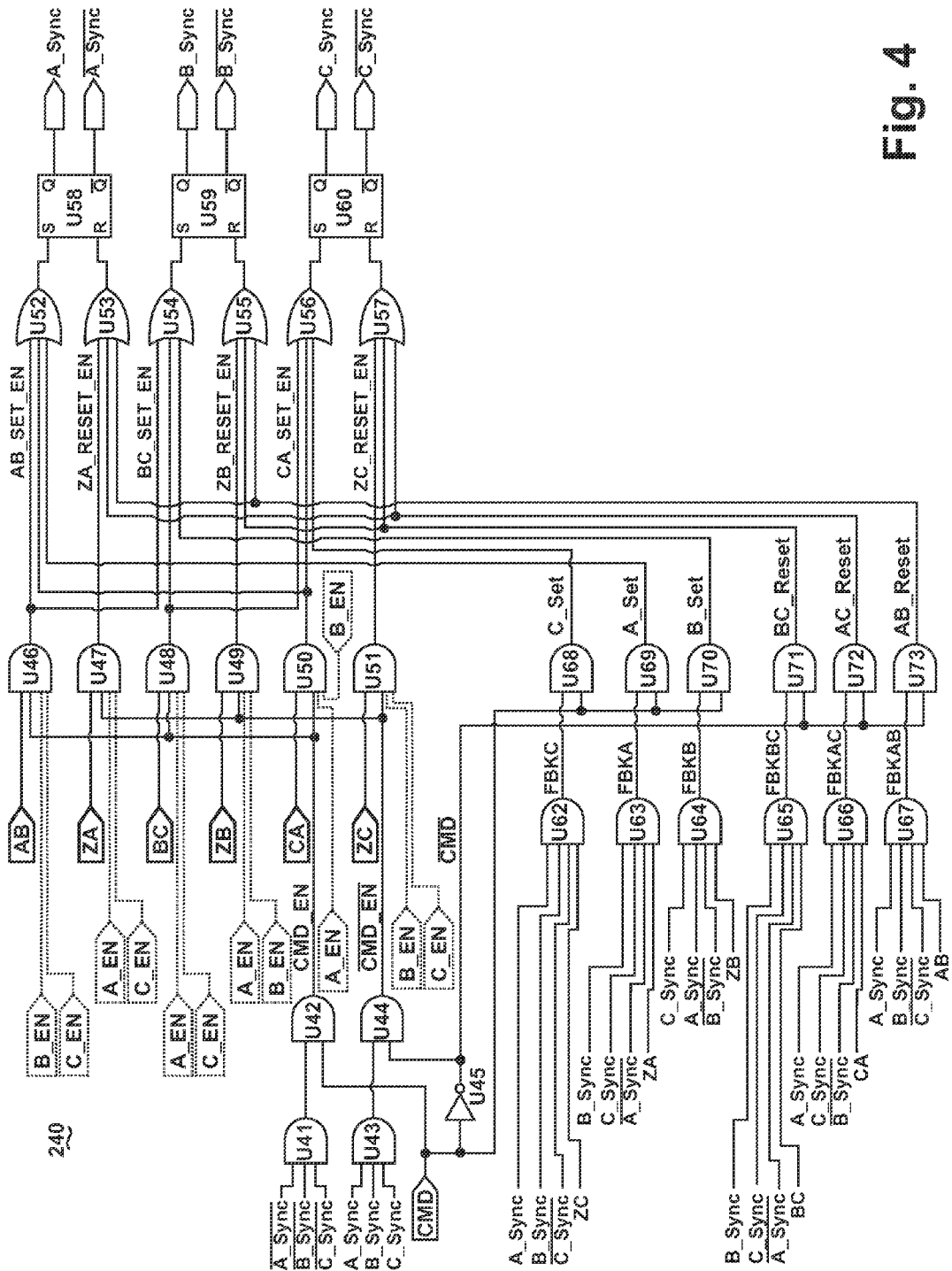
FIG. 4 is a circuit diagram of a synchronization logic circuit incorporated in the circuit for applying the three phase power source to a load of FIG. 1 according to another embodiment of the present invention.

The method of applying a three phase supply 104 to a three phase load 160 in a variable manner, where it does not matter in which order each of the loads A, B, and C are applied, has been described above. For some applications, however, it is necessary to apply the phases of the power source 104 to the load in a particular and fixed sequence. This mode of operation, referred to as fixed phase functionality, is described herein. Referring now to FIG. 4, the circuit implementation 240 of the fixed phase mode is similar to the variable phase functionality described in conjunction with FIG. 2, except that there are additional inputs to the circuit A_EN, B_EN, and C_EN, corresponding to enabling the A_SYNC, B_SYNC, and C_SYNC signals, respectively. In particular, the enable signals A_EN, B_EN, and C_EN are provided as inputs to four input AND gates U46, U47, U48, U49, U50, and U51. Upon activation of one of the enable signals A_EN, B_EN or C_EN and CMD, the synchronization logic activates A_SYNC, B_SYNC and C_SYNC in a fixed predetermined order or phase rotation. Thus, power is supplied and removed from the load 160 in that fixed predetermined order or phase rotation.

When A_EN is enabled and CMD is activated, the synchronization logic 240 first activates A_SYNC and B_SYNC concurrently at phase A and B crossing and then C_SYNC afterwards at phase C zero crossing. Continuing with A_EN enabled, when CMD is deactivated, C_SYNC is first deactivated at the corresponding zero phase crossing of phase C and then afterwards A_SYNC and B_SYNC are concurrently deactivated at the corresponding mutual phase crossing of phases A and B. Similarly, when B_EN is enabled and CMD is activated, the synchronization logic 240 first activates B_SYNC and C_SYNC concurrently at the phase B and C crossing and then A_SYNC afterwards at the zero crossing of phase A. With B_EN activated and upon deactivation of CMD, A_SYNC is first deactivated at the zero crossing of phase A and then afterwards B_SYNC and C_SYNC are deactivated concurrently at the mutual crossing of phase B and C. When C_EN and CMD are activated, the synchronization logic 240 first activates C_SYNC and A_SYNC concurrently at the mutual phase crossing of phases C and A and then B_SYNC upon the zero crossing of phase B. Continuing with C_EN activated, when CMD is deactivated, B_SYNC is first deactivated at the zero phase crossing of phase B and then C_SYNC and A_SYNC are concurrently deactivated at the corresponding mutual phase crossing of phases A and C. In other words, if A_EN is activated, and B_EN and C_EN are deactivated, at the first A phase and B phase mutual crossing with corresponding pulse on signal AB after CMD is initiated, A_SYNC and B_SYNC is activated and thus power is applied to the Phase A Load and Phase B Load. Subsequent to the A_SYNC and B_SYNC activation, when the first C phase zero crossing, with corresponding pulse on ZC, occurs, C_SYNC is activated, thus applying power to the C Phase load. When CMD is deactivated, C_SYNC is deactivated at the subsequent C phase zero crossing, detected by detecting a pulse on pulse signal ZC, and thereby removing power from the Phase C Load. A_SYNC and B_SYNC are then deactivated at the subsequent A phase and B phase mutual crossing and thereby removing power from the A and B phase load. Therefore, setting of the enabling signals A_EN, B_EN, and C_EN enables the application of the phases A, B, and C of the power supply 104 in a desired order to the load 160.

With respect to the embodiments described herein, the terms "first", "second" and "third" phases apply to the ordinal number of the phase transition event or peak event with respect to a point in time in which power is required in the load as described in conjunction with FIG. 3 or with respect to a formal enumeration of the phases as described in conjunction with FIG. 4. As described in conjunction with FIG. 3, the sequencing of phases to their respective loads can occur according to the principle of "next available phase" and is referred to as "opportunistic sequencing", and provides the advantage of more immediate power availability. In contrast, phases can be switched to their respective loads according to a predetermined order as described in conjunction with FIG. 4. This method is referred to as "deterministic sequencing", and applies when power must be applied in a specific, predefined sequence.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of applying a three phase power source to a three phase load comprising the steps of:
   A. receiving a first sense signal corresponding to a first phase of the power source, a second sense signal corresponding to a second phase of the power source, and a third sense signal corresponding to a third phase of the power source;

B. detecting a mutual crossing of the first and second sense signals and determining if a command signal is activated and if the mutual crossing is detected and the command signal is activated then activating a first synchronization signal corresponding to the first phase of the power source and activating a second synchronization signal corresponding to the second phase of the power source;

C. determining if the first and second synchronization signals are activated and if the first and second synchronization signals are activated, then applying the first and the second phases of the power source to the first and second phases of the load, respectively;

D. detecting a zero crossing of the third sense signal and if the zero crossing is detected and if the first and second synchronization signals are activated, then activating a third synchronization signal corresponding to the third phase of the power source;

E. determining if the third synchronization signal is activated and if the third synchronization signal is activated, then applying the third phase of the power source to the third phase of the load; and F. returning to step A if the first, second, and third synchronization signals are not activated.

2. The method of claim 1 wherein the first sense signal, the second sense signal, and the third sense signals correspond to the voltage of the first, second, and third phases of the three phase power source, respectively.

3. The method of claim 1 wherein detecting a mutual crossing comprises applying the first and second sense signals to a comparator circuit and generating a first pulse signal with a pulse at the output when the first and second sense signals are equal.

4. The method of claim 3 wherein activating the first and second synchronization signals comprises providing the first pulse signal and the command signal to a synchronization circuit, wherein the synchronization circuit activates the first and second synchronization signals upon detecting a pulse in the first pulse signal and if the command signal is activated.

5. The method of claim 1 wherein detecting a zero crossing comprises applying the third sense signal and a ground reference to a comparator circuit and generating a second pulse signal with a pulse at the output when the third sense signal is equal to the ground reference.

6. The method of claim 5 wherein activating the third synchronization signal comprises providing the second pulse signal and the command signal to a synchronization circuit, wherein the synchronization circuit activates the third synchronization signal upon detecting a pulse in the second pulse signal and if the command signal is activated.

7. The method of claim 1 wherein the first, second, and third synchronization signals, and the command signal are considered activated when the first, second, and third synchronization signals, and the command signal are set to a logical 1 level, respectively.

8. The method of claim 1 wherein the first, second and third sense signals are generated by a sensor circuit with input of the three phase power source and comprising a step down transformer.

9. The method of claim 1 wherein applying the third phase of the power source comprises a drive switch with inputs of the three phase power source and the third synchronization signal, wherein the drive switch applies the third phase of the power source to the third phase of the load when the third synchronization signal is activated.

10. The method of claim 1 further comprising the steps of:

G. determining if the command signal is activated and if the first, second, and third synchronization signals are activated;

H. then detecting a successive zero crossing of one of the first, second, and third sense signals and if the first, second, and third synchronization signals are activated, if the command signal is deactivated, and if the successive zero crossing is detected, then deactivating the synchronization signal corresponding to the sense signal for which the successive zero crossing is detected;

I. determining if one of the first, second, and third synchronization signals is deactivated and if one of the synchronization signals is deactivated, then removing the phase of the power source associated with the deactivated synchronization signal from the load;

J. detecting a successive mutual crossing of the sense signals corresponding to the synchronization signals still activated, and if the mutual crossing is detected and if one of the synchronization signals is deactivated, then deactivating the activated synchronization signals;

K. removing the phases of the power supply from the load for which the corresponding synchronization signal is activated; and L. returning to step G, if none of the synchronization signals are activated.

11. The method of claim 1 wherein the first, second and third phases are applied in sequence.

12. A circuit for applying three phase power source to a three phase load comprising:

sensing means for sensing first, second and third phases of the three phase power source and generating first, second, and third sense signals corresponding to the first, second, and third phases, respectively;

detection means for detecting zero crossings and mutual crossings of the first, second, and third sense signals;

synchronization means for activating and deactivating command signals and synchronization signals based on zero crossings, and for determining if command signals and synchronization signals are activated; and switch means for applying the first, second and third phases of the three phase power source to first, second and third phases of the three phase load depending on the determination of the synchronization means, wherein the synchronization means is configured to activate and deactivate command signals to the switch means using opportunistic sequencing to minimize electromagnetic interference and heat generated by the switch means.

13. The circuit of claim 12 wherein the sensing means comprises a step down transformer.

14. The circuit of claim 12 wherein the first, second, and third sense signals correspond to the voltage of the first, second, and third phases of the three phase power source.

15. The circuit of claim 12 wherein the detection means comprises at least one comparator and at least one monostable multivibrator.

16. The circuit of claim 12 wherein the detection means generates a pulse signal corresponding to each of the zero crossings and mutual crossings of the first, second, and third sense signals.

17. The circuit of claim 12 wherein the synchronization means detecting the pulse signals corresponding to each of the zero crossing and mutual crossing of the first, second, and third sense signals and determining the synchronization signals based on the first, second, and third sense signals and the command signal.

18. The circuit of claim 12 wherein the switch means comprises one of at least one metal-oxide-semiconductor field effect transistor (MOSFET) constructed AC switch and at least one insulated gate bipolar transistor (IGBT) constructed AC switch.

19. The circuit of claim 12 wherein the first, second and third phases are applied in a fixed phase functionality sequence.

\* \* \* \* \*